Oct. 27, 1964

G. V. IRELAND 3,153,920

BALL DRIVE FLEXIBLE COUPLING

Filed Oct. 12, 1962

INVENTOR.
GLEN V. IRELAND
BY
*Mann, Brown & McWilliams*
ATTORNEYS

United States Patent Office 3,153,920
Patented Oct. 27, 1964

3,153,920
BALL DRIVE FLEXIBLE COUPLING
Glen V. Ireland, 6605 W. Bennett, Milwaukee, Wis.
Filed Oct. 12, 1962, Ser. No. 230,079
5 Claims. (Cl. 64—8)

My invention relates to a ball drive flexible coupling, and more particularly, to a ball drive flexible coupling device for coupling together driving and driven shafts that may be, or may be caused to be, somewhat out of shaft alignment.

Prime movers, such as electric motors and internal combustion engines, are widely utilized to actuate apparatus that is rendered operative by having some element rotated. The nature of mechanical structures is such that the driving and driven components include rotating shaft elements, and a common way to transmit the drive is to couple the shafts together by simple mechanical coupling or joining devices, as distinguished from the use of gearing, or couplings of a magnetic or hydraulic type.

These mechanical coupling or joint devices contemplate that the shaft components of the driving and driven apparatus will be in substantial axial alignment, but as a practical matter, assembly tolerances actually practiced frequently result in the driving and driven shafts being out of alignment by as much as several degrees.

This is a particularly troublesome factor in the railroad field, where the driving apparatus, such as the diesel engine of the modern locomotive, and the driven apparatus, such as the air compressor for supplying air to the brake system, are mounted on a common supporting car framework that tends to flex and shift due to coupler impacts and track level deviations.

While it has long been the practice to use flexible couplings in coupling the driving and driven shafts of such apparatus together, conventional flexible couplings do not operate efficiently if the shafts involved are more than a few thousandths of an inch out of alignment, and they require periodic lubrication if premature failures are to be avoided.

For instance, a common form of conventional flexible coupling used for coupling together the power take off shaft of the locomotive diesel engine with the compressor that is commonly carried on the locomotive includes a pair of flanged coupling members that are received over the respective shafts and bolted together on either side of a rubber disc separating member that is intended to flex to accommodate the shaft misalignment.

Experience has shown that the flexible disc develops fatigue in a relatively short period of time, with the result that it becomes brittle and disintegrates. Railroad operating rules have come to require that these couplings must be inspected every ninety days to catch coupling failures, and if for some reason the inspection is not made in the required time, the locomotive involved must be taken out of service until this is done.

A principal object of this invention is to provide a flexible coupling that is especially suited for use in railroad equipment in accommodating shaft misalignment caused by the operating conditions peculiar to that art.

Another important object of the invention is to provide a flexible coupling arrangement that operates just as efficiently and for as long as useful life with the shafts misaligned as when they are in substantial alignment.

Still another important object of the invention is to provide a flexible coupling device in which shaft misalignment may be accommodated without subjecting any part of the coupling to any greater stress or wear than it would be subjected to if the shafts were in substantial alignment.

A further important object of the invention is to provide a flexible coupling arrangement that provides for long-term self-lubrication of its parts, thus avoiding the periodic inspection problem, to provide a flexible coupling arrangement contemplating a novel torque transmitting feature, and to provide a flexible coupling arrangement that is inexpensive of manufacture, that may be installed without special modification or re-location of the apparatus that it connects, and that is adapted for a wide variety of uses.

Other objects, uses, and advantages will become obvious or be apparent from a consideration of the following detailed description and the drawing.

However, it should be understood that the specific drawing illustrations provided are primarily for the purpose of complying with the requirements of 35 U.S.C. 112, and that the invention is susceptible of other specific embodiments that will be obvious to those skilled in the art.

Figure 1:
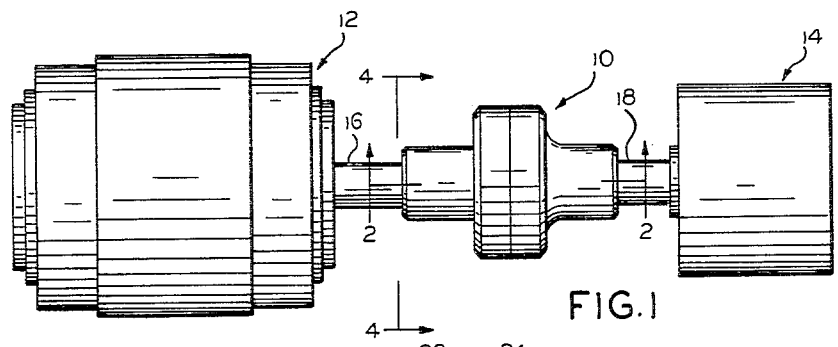
FIGURE 1 is a diagrammatic plan view of the flexible coupling device as it may be employed to connect a prime mover with an auxiliary driven apparatus, such as an air compressor.

Reference numeral 10 of FIGURE 1 generally indicates a preferred embodiment of this invention applied between a prime mover 12 and an auxiliary apparatus 14 for the purpose of transmitting torque to the latter. Coupling 10 is shown connecting the driving shaft 16 of apparatus 12 with the driven shaft 18 of apparatus 14, and it should be understood that the apparatus generally indicated at 12 is intended to represent any prime mover that provides shaft 16 with an angular torque output, while apparatus 14 is intended to represent any apparatus which includes a shaft 18 that is to be rotated by connection with a source of angular torque.

Figure 2:
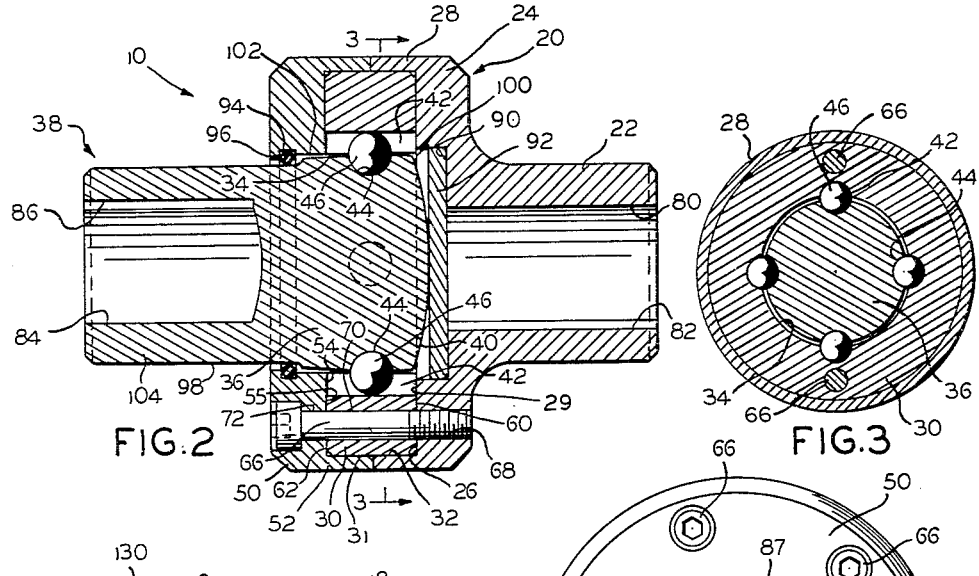
FIGURE 2 is a cross-sectional view through the coupling structure per se, approximately along line 2—2 of FIGURE 1.
Figure 3:
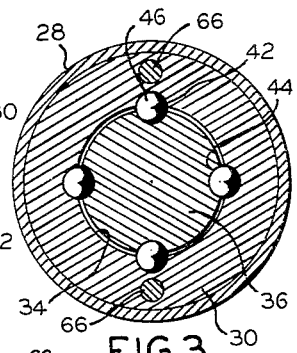
FIGURE 3 is a cross-sectional view on a reduced scale approximately along line 3—3 of FIGURE 2.
Figure 4:
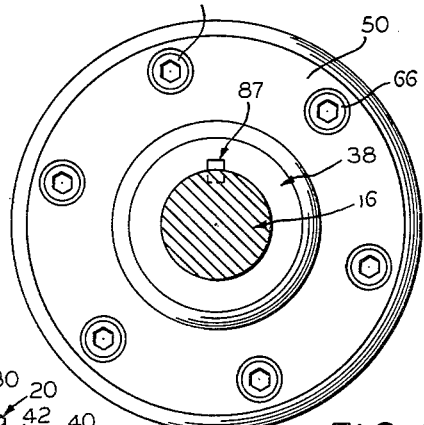
FIGURE 4 is a side elevational view of the coupling shown in FIGURE 1, taken approximately along line 4—4 of FIGURE 1, with parts shown in section.

Referring now to FIGURES 2, 3, and 4, it will be observed that coupling 10 generally comprises a hub member 20 defining a hub portion 22 and a flanged end portion 24.

The flange portion 24 of hub member 20 is recessed as at 26 to define an annular rim portion 28 and thus a seat 29 which receives an annular ball retainer member 30 that has its outer periphery 31 proportioned to substantially complement the configuration of rim surface 32 of rim 20, which in the specific embodiment illustrated is circular.

The ball retainer member 30 has its bore 34 (see FIGURE 3) proportioned to receive one end 36 of a stud member 38 that is provided with a spherically contoured end portion 40.

The ball retainer member 30 is formed with a plurality of ball retaining grooves or recesses 42 that extend longitudinally of the axis of annular member 30 and are rectilinear lengthwise thereof, as clearly shown in FIGURE 2. The end portion 36 of stud member 38 is formed with a like number of spherically contoured indentations or recesses 44, and in accordance with this invention, the grooves 42 and the recesses 44 are respectively aligned in pairs to receive a bearing ball 46.

Preferably, the grooves or recesses 42 should have a transverse cross-sectional configuration (see FIGURE 3) that is substantially complementary to approximately a hemisphere of the respective bearing balls 46, while the respective recesses 44 have a concave configuration that substantially complements approximately a hemispherical portion of the respective bearing balls 46. Also, the end portion 36 of stud member 38 in the area of recesses 44 has a transverse cross-sectional configuration that substantially complements the diameter of bore 34 of retainer member 30 (see FIGURES 2 and 3).

The ball retainer member 30 preferably has a lateral thickness that exceeds the length of hub member flange portion 28, and applied over the ball retainer member 30 is an annular cap member 50, which is formed with an annular skirt or rim portion 52 proportioned to define a seat 54 in the cap member in which the ball retainer member 30 is received.

Further in accordance with this invention, the proportioning of the hub member skirt portion 28, the cap member skirt portion 52, and the lateral thickness of the ball retainer member 30 is such that the surfaces 26 of the hub member and 55 of the cap member are in abutting engagement with the side surfaces 60 and 62, respectively, of the ball retainer member when the cap member is applied thereto in the manner shown in FIGURE 2. Also, surfaces 26, 55, 60 and 62 are substantially planar and are disposed in parallel planes.

As indicated in FIGURES 2, 3, and 4, the hub member and cap member are secured together against the ball retainer member 30 by a plurality of bolts 66, and in the illustrated arrangement, for this purpose the hub member is provided with a plurality of tapped holes 68 that are adapted to be aligned with holes 70 of the ball retainer member 30 and holes 72 of the cap member to receive the respective bolts 66.

In the illustrated embodiment, the hub member 20 is provided with a bore 80 to receive one end of a shaft 18 as well as a keyway 82 to receive an appropriate keying device, while a stud member 38 is formed with a bore 84 and a keyway 86 for similar application to a shaft 16. An appropriate key is indicated at 87 in FIGURE 4.

Further in accordance with this invention, the coupling 10 is provided with a sealed built-in lubrication feature. As shown in FIGURE 2, the hub member flange portion 24 is recessed as at 90 to receive a hardened washer or disc 92 that is proportioned to substantially complement the outline of the recess 90.

The cap member is formed with an annular groove 94 in which an O-ring seal 96, formed from a suitable flexible gasketing material such as rubber, is mounted, and preferably the O-ring seal 96 is proportioned for frictional engagement with the external surface 98 of stud member 38.

The disc or washer 92 is imperforate and it together with the O-ring seal 96 seals off the coupling space 100 in which the bearing balls 46 are mounted. I prefer to fill this space with a suitable grade of grease as the coupling is being assembled so that when the assembly is complete, the flexing portions of the coupling are in effect sealed in a grease packing that is substantially permanent in nature.

Preferably, the ball retainer member 30, the cap member 50, and the stud member 38 are formed from a material, such as 4140 steel, that will permit these elements to be heat treated to a hardness of about 60 Rockwell. The stud member 38, however, requires this hardness only in the area of the ball bearing sockets 44 and may be selectively heat treated to achieve this end. In the illustrated form, the stud member end portion 36 is shown somewhat enlarged, and its side surfaces 102 may be made convex in longitudinal configuration to increase the angulation permissible by coupling 10.

The hub member 20 may be formed from any suitable material, such as 1020 (mild) steel, while the bearing balls should have a hardness comparable to that of the ball retainer member 30.

In applying the coupling unit 10 to any particular installation situation, such as to connect the prime mover 12 with the apparatus 14, the hub member 20 with the disc 92 applied thereto is slipped over the end of the shaft 18 while the stud member 38 with the cap member 50 applied thereto is slipped over the end of the shaft 16. The hub portion 22 of hub member 20 and the hub portion 104 of the stud member 38 are proportioned so that these members can receive an adequate amount of the respective shafts 16 and 18 and permit the end portion 40 of stud member 38 to be spaced somewhat from disc or washer 92 for assembly purposes.

After the hub and stud members have been applied to the respective shafts and before the keys are applied, the hub and stud members are separated sufficiently axially of the shafts so that lubricant may be applied to the inner surface of disc 92 and the ball retainer member 30 may be applied to its seat 29 while at the same time exposing the ball bearing seats 44 at one side of the ball retainer (which would be at the left hand side in the showing of FIGURE 2). The individual balls 46 are then applied to the respective recesses 44, after which the ball retainer member 30 is slipped over them to position the individual balls 46 in the respective ball retainer recesses 42. A suitable quantity of lubricant is then applied about the outwardly facing side of the ball retainer member 30 in the area of recesses 42, and then the hub member 20 and the cap member 50 are moved into abutting engagement with the ball retainer member 30, after which the respective holes of these members are aligned for application of bolts 66. Bolts 72 are turned into the threaded holes 68 to tightly clamp the hub member 20 and the cap member against the side faces 60 and 62 of the ball retainer member, and to insure this clamping action, the skirts 28 and 52 may be proportioned to be spaced slightly from each other in the assembled condition of the device.

The coupling keys 87 or other suitable keying arrangements may then be applied to key the coupling to the respective shafts.

It will be found that the device 10 can be applied to shafts equivalent to shafts 16 and 18 that are as much as five degrees or more out of alignment, whereas flexible couplings of the type now in use permit shaft, misalignment not in excess of three thousandths of an inch.

Figure 6:
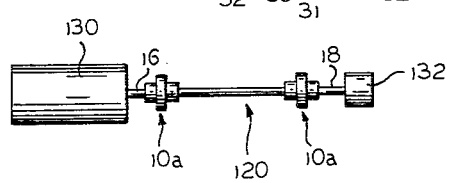
FIGURE 6 is a small scale diagrammatic plan view showing a practical application of the device of FIGURE 5.
Figure 5:
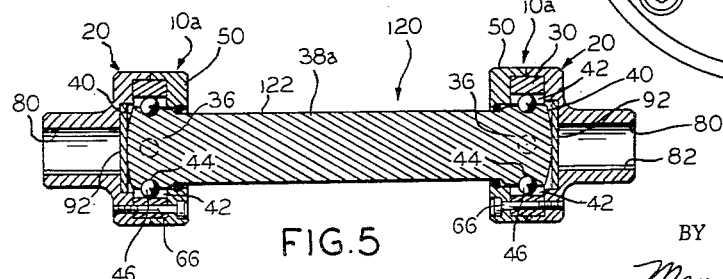
FIGURE 5 is a small scale view illustrating a modified form of coupling device in accordance with this invention.

Referring now to the embodiment 120 of FIGURES 5 and 6; the flexible coupling unit 120 generally comprises a pair of devices 10a that are essentially the same as the device 10, as indicated by corresponding reference numerals, except that the stud member 38a is in the form of a shaft element 122 provided with two end portions 36, as indicated in FIGURE 5.

In this embodiment of the invention, both the driving and driven shaft ends are received in the respective bores 80 of the respective hub members 20 in the embodiment of FIGURES 5 and 6.

FIGURE 6 diagrammatically illustrates the device 120 applied to a driving shaft 16 operated by a diesel engine 130 and a driven shaft 18 of a compressor 132, and this may be done by applying hub members 20 to the respective shafts, applying cap members 50 to either end of shaft element 122, placing the respective retainer members 30 within the respective hub members, positioning the shaft element between the hub members 20, and then completing the assembly of the respective couplings 10a in the manner already indicated.

The embodiment of FIGURES 5 and 6 increases the shaft misalignment that can be accommodated by reason of the use of the two flexing coupling portions 10a. Also, it permits the ends of the driving and driven shafts to be spaced apart a substantial amount. In this connection, the stud member 38a of the embodiment of FIGURES 5 and 6 may be made available in varying standard lengths to accommodate specific installations.

In operation, when the unit 10 is applied to the driving and driven shafts in the manner indicated, the stud member 38 will be angled or cocked somewhat with respect to the hub member 20, depending upon the amount of shaft misalignment involved. When the driving shaft is rotated by the prime mover, the angular torque output is transmitted by the stud member through the ball bearing members 46 and a ball retainer member 30, and bolts 72 to the hub member 20, which in turn transmits it to the driven shaft. The torque transmitted is not affected by the amount of shaft misalignment, and the stress on the bearing balls 46 is substantially the same whether or not the driving and driven shafts are misaligned.

The sealing disc 92 acts as a stop to limit movement of the stud member toward the hub member, and convex surface 40 of the stud member is shaped to avoid interference with disc 92 as the coupling flexes.

Similar remarks apply to the embodiment 120 except that two oppositely disposed flexible coupling units are involved instead of one and the drive is thus transmitted from the driving shaft to the driven shaft accordingly.

It will be noted that in my coupling arrangement, no reliance is placed on a flexible or flexing member or element to accommodate shaft misalignment, and consequently the wear and replacement problems generally associated with such flexible or flexing members or elements are eliminated by my invention.

A practical application of the specific embodiment of this invention illustrates its significance in the railroad art. A coupling device arranged in accordance with the embodiment 120 was applied to a diesel locomotive to transmit power from the main diesel engine to drive a Gardner-Denver three cylinder two-stage air compressor, and this was done without any special modification or relocation of the engine, crank shaft, the air compressor, or the drive shaft guard. At the time of the last check on this installation, the locomotive involved had been running continuously for ten months as a switcher, and there was no evidence of a wearing of the coupling or the need for further lubrication. When one considers that heretofore it has required approximately a day and a half of labor just to line up prior art couplings of this type, and that such couplings require mandatory inspection and lubrication at 90 day intervals, it will be appreciated that the instant device must be considered a remarkable improvement since it not only accommodates a considerable amount of shaft misalignment, but also eliminates the periodic inspections that have been heretofore required.

The foregoing description and the drawings are given merely to explain and illustrate my invention and the invention is not to be limited thereto, except insofar as the appended claims are so limited, since those skilled in the art who have my disclosure before them will be able to make modifications and variations therein without departing from the scope of the invention.

I claim:

1. A ball drive coupling device for coupling together rotatable shafts, said device comprising:
    a hub member having one end thereof adapted for connection to a shaft member, and the other end thereof formed with an annular recess that is concentrically located with respect to the central axis of said hub member,
    an annular ball retainer member received in said recess in substantial axial alignment with said hub member,
    said ball retainer member having its outer diameter substantially complementing the rim of said hub member recess,
    said ball retainer member being formed with a plurality of ball retaining grooves about its bore,
    said grooves extending longitudinally of the axis of said bore and being rectilinear lengthwise thereof,
    a stud member having one end thereof received in said bore of said retainer member,
    said stud member one end being formed about its periphery to define a plurality of sockets positioned and numbered for alignment with said retainer member grooves, respectively,
    with the other end of said stud member being adapted for connection to a second shaft member,
    said sockets and said grooves being respectively aligned,
    a ball member received in each of the aligned grooves and sockets, respectively,
    an annular cap member fixed to said hub member and proportioned to be received over said stud member and the said retainer member grooves,
    means for fixing said ball retainer member against rotation with respect to said hub member,
    said cap member being proportioned to engage both said hub member and said retainer members,
    said fixing means comprising bolt means for drawing said cap member into substantial abutting engagement with said hub member and said retainer member.

2. The device set forth in claim 1 wherein:
    the other end of said stud member is formed as defined with regard to said one end thereof in claim 10,
    said other end of said stud member being operably associated with a second hub member, ball retainer member, ball members, cap member and fixing means, all arranged with respect thereto as defined in claim 10.

3. The device set forth in claim 1 wherein:
    said stud member other end is formed to receive one end of a second shaft member.

4. A ball drive coupling device for coupling together rotatable shafts, said device comprising:
    a hub member having one end thereof adapted for connection to shaft member, and the other end thereof formed with an annular recess that is concentrically located with respect to the central axis of said hub member and defines an annular rim about said hub member,
    an annular ball retainer member received in said recess in substantial axial alignment with said hub member,
    said retainer member being proportioned axially thereof to project outwardly of said annular recess and beyond said rim,
    said ball retainer member having its outer diameter substantially complementing the rim of said hub member recess,
    said ball retainer member being formed with a plurality of ball retaining grooves about its bore,
    said grooves extending longitudinally of the axis of said bore and being rectilinear lengthwise thereof,
    a stud member having one end thereof received in said bore of said retainer member,
    said stud member one end being formed about its periphery to define a plurality of sockets positioned and numbered for alignment with said retainer member grooves, respectively,
    with the other end of said stud member being adapted for connection to a second shaft member,
    said sockets and said grooves being respectively aligned transversely of said device, and said stud member one end being proportioned in the area of said sockets to substantially complement said retainer member bore,
    said sockets and said grooves defining substantially hemispherical configurations transversely of the central axis of said retainer member and said stud member respectively,
    a ball member received in each of the aligned grooves and sockets, respectively, said sockets being spherically contoured and complementing hemispherical portions of said ball members, respectively,
an annular cap member fixed to said hub member and proportioned to be received over said stud member and the said retainer member grooves,
said cap member being formed with an annular recess in which said retainer member is received that is concentrically located with respect to the central axis of said cap member and that defines an annular rim about said cap member,
said cap member rim substantially complementing the outer diameter of said retainer member and extending proximate said hub member,
and bolt means extending between said cap and hub members and through said retainer member for drawing said cap and hub members into abutting engagement with said retainer member and said rims into substantial abutting engagement.

5. A ball drive coupling device for coupling together rotatable shafts, said device comprising:
a hub member having one end thereof adapted for connection to a shaft member and having the other end thereof formed to define a substantially planar annular surface extending transversely of the central axis thereof,
an annular ball retainer member defining substantially planar end surfaces extending transversely of the axis thereof,
a stud member having one end thereof received in the bore of said retainer member,
an annular cap member received over said stud member and having the end thereof facing said retainer formed to define a substantially planar annular surface extending transversely of the central axis thereof,
said cap member planar surface being positioned in abutting relation with the end surface of said retainer member facing it,
and said hub member planar surface being positioned in abutting relation with the other end surface of said retainer member,
bolt means extending between said cap and hub members for drawing said cap and hub members into clamping engagement with said surfaces of said retainer member,
said ball retainer member being formed with a plurality of ball retainer grooves about its bore,
said grooves extending longitudinally of the axis of said retainer member bore and being rectilinear lengthwise thereof,
said stud member one end being formed about its periphery to define a plurality of sockets positioned and numbered for alignment with said retainer member grooves, respectively,
said sockets and said grooves being respectively aligned transversely of said retainer and stud members, and said stud member one end being proportioned in the area of said sockets to substantially complement said retainer member bore,
a ball member received in each of the aligned grooves and sockets, respectively,
said grooves defining substantially hemispherical configurations transversely of the central axis of said retainer member that substantially complement the peripheries of said balls, respectively,
said sockets being formed to complement hemispherical portions of said balls, respectively, whereby said balls are firmly seated against displacement in said sockets, thereby eliminating the need for a separate ball retainer device.

References Cited in the file of this patent

UNITED STATES PATENTS

| | | |
|---|---|---|
| 2,645,105 | Bedson | July 14, 1953 |
| 2,968,936 | Croset | Jan. 24, 1961 |
| 3,017,756 | Sharp | Jan. 23, 1962 |

FOREIGN PATENTS

| | | |
|---|---|---|
| 19,605 | Great Britain | Aug. 17, 1911 |
| 8,775 | Great Britain | Sept. 7, 1911 |

UNITED STATES PATENT OFFICE
CERTIFICATE OF CORRECTION

Patent No. 3,153,920                          October 27, 1964

Glen V. Ireland

It is hereby certified that error appears in the above numbered patent requiring correction and that the said Letters Patent should read as corrected below.

Column 6, lines 27 and 32, for the claim reference numeral "10", each occurrence, read -- 1 --; line 39, after "to" insert -- a --.

Signed and sealed this 20th day of April 1965.

(SEAL)
Attest:

ERNEST W. SWIDER                              EDWARD J. BRENNER
Attesting Officer                                   Commissioner of Patents